US010615681B2

United States Patent
Nonaka et al.

(10) Patent No.: US 10,615,681 B2
(45) Date of Patent: Apr. 7, 2020

(54) SWITCHING POWER SUPPLY CIRCUIT

(71) Applicant: Mitsubishi Electric Corporation, Chiyoda-ku, Tokyo (JP)

(72) Inventors: Takafumi Nonaka, Tokyo (JP); Kentaro Oshima, Tokyo (JP); Teruyoshi Sato, Tokyo (JP); Norihiro Suzuki, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 16/303,259

(22) PCT Filed: May 19, 2017

(86) PCT No.: PCT/JP2017/018883
§ 371 (c)(1),
(2) Date: Nov. 20, 2018

(87) PCT Pub. No.: WO2017/204115
PCT Pub. Date: Nov. 30, 2017

(65) Prior Publication Data
US 2019/0207507 A1 Jul. 4, 2019

(30) Foreign Application Priority Data

May 25, 2016 (JP) ................. 2016-104038

(51) Int. Cl.
*H02M 1/14* (2006.01)
*H02M 3/28* (2006.01)
(Continued)

(52) U.S. Cl.
CPC ............ *H02M 1/143* (2013.01); *H02M 1/08* (2013.01); *H02M 3/28* (2013.01);
(Continued)

(58) Field of Classification Search
CPC .......... H02M 1/4258; H02M 3/33523; H02M 3/33553
(Continued)

(56) References Cited

U.S. PATENT DOCUMENTS 5,517,397 A * 5/1996 Quek ................ H02M 3/33507
363/21.16
5,880,942 A * 3/1999 Leu ........................ H02M 1/36
363/131

(Continued)

FOREIGN PATENT DOCUMENTS

JP    H07213053 A    8/1995
JP    2015173043 A   10/2015

OTHER PUBLICATIONS

International Search Report (with English Translation) and Written Opinion issued in International Patent Application No. PCT/JP2017/018883, dated Aug. 8, 2017, 6 pages.

*Primary Examiner* — Gary A Nash
(74) *Attorney, Agent, or Firm* — Buchanan Ingersoll & Rooney PC

(57) ABSTRACT

A rectifying element is connected to an auxiliary winding. The shut-down circuit receives a bias voltage output from the rectifying element. A shut-down circuit stops supply of power to a power supply terminal of the power supply control IC when the bias voltage is less than a set voltage. A power supply control IC controls a ratio of on-time to a switching cycle of the switching element, based on a current sensing voltage generated at a current sense resistor. The power supply control IC causes the switching operation of the switching element to stop when a voltage at the power supply terminal decreases to a stop voltage or less.

8 Claims, 6 Drawing Sheets

(51) Int. Cl.
  *H02M 1/08* (2006.01)
  *H02M 3/335* (2006.01)
  *H02M 1/42* (2007.01)

(52) U.S. Cl.
  CPC ...... *H02M 3/33523* (2013.01); *H02M 1/4258* (2013.01); *H02M 3/33553* (2013.01)

(58) Field of Classification Search
  USPC .......... 363/21.08, 21.1, 21.16, 21.18, 50, 67
  See application file for complete search history.

(56) References Cited

U.S. PATENT DOCUMENTS

| | | | | |
|---|---|---|---|---|
| 6,445,598 B1* | 9/2002 | Yamada | ............ | H02M 3/33507 363/21.12 |
| 6,646,894 B2* | 11/2003 | Hong | ................ | H02M 3/33507 348/E5.127 |
| 8,824,172 B2* | 9/2014 | Chen | ................. | H02M 3/33507 363/21.12 |
| 2006/0056205 A1* | 3/2006 | Kyono | ................... | H02M 1/32 363/15 |

* cited by examiner

SWITCHING POWER SUPPLY CIRCUIT

TECHNICAL FIELD

The present invention relates to a switching power supply circuit.

BACKGROUND ART

Conventionally, if no overcurrent protection function or circuit corresponding thereto is separately provided, switching power supply circuits exhibit different characteristics in an overcurrent condition and in the event of a load short-circuit, depending on the operational topology of the switching power supply circuits.

For example, flyback switching power supply circuits exhibit a gentle decrease of an output voltage with an increase of output current in the event of an overcurrent. This is generally known as "inverted V-shaped" characteristics (constant-power control voltage droop type). Forward switching power supply circuits exhibit a decrease of an output voltage and an output current, upon an increase of the output current in the event of overcurrent. This is generally known as droop characteristics.

When a switching power supply circuit has the characteristics as described above, a semiconductor device is overloaded in the event of overcurrent and may be damaged due to abnormal overheat. For this reason, a protection circuit may be added for overcurrent protection and load short-circuit protection, in addition to the basic circuitry for the switching power supply (a component configuration necessary as a topology).

There is also a method which prevents abnormal overheat of the components of the switching power supply circuit, in the events of load short-circuit and overcurrent, without adding such a protection circuit. The method prevents the abnormal overheat by intermittent operation which makes use of a decrease of a bias voltage with a decrease of the output voltage.

Upon load short-circuit condition or overcurrent condition in the switching power supply circuit, electrical energy conveyed by a transformer temporarily rapidly increases, and a voltage generated at an auxiliary winding may increase greater than an original design value. However, most of the energy is absorbed into a capacitor included in the auxiliary winding and thus the bias voltage is less likely to jump up. Then, due to the action, by a circuit, of sensing the load short-circuit condition or overcurrent condition, a ratio of on-time of a primary-side switch circuit to a switching cycle (Hereinafter, referred to as ON-Duty or a duty ratio of a pulse width modulation (PWM) signal) decreases, which decreases a secondary-side output voltage and the bias voltage that is obtained from the auxiliary winding of the transformer (Operation 1).

As the bias voltage decreases to a stop voltage for a power supply control IC, the power supply control IC causes the primary-side switch circuit to stop operating. A capacitor connected to the power supply terminal of the power supply control IC is then charged with a voltage input via an activation resistor. As the capacitor has reached a start voltage for the power supply control IC, the power supply control IC causes the primary-side switch circuit to operate again (Operation 2).

If the load short-circuit condition or overcurrent condition persists, the above operations 1 and 2 are repeated, thereby preventing the switching power supply circuit and the load connected thereto from being abnormally heated.

The repeating of the operations 1 and 2 as the above is known as an intermittent operation. The intermittent operation is a common as a protection operation to take upon the load short-circuit condition or overcurrent condition. Such an intermittent operation can prevent the switching power supply circuit, in the load short-circuit condition or overcurrent condition, from being abnormally heated, thereby improving the safety of the switching power supply circuit.

Moreover, in the switching power supply circuit, for the power supply terminal of the power supply control IC which outputs a signal that drives the primary-side switch circuit, an applied voltage at which the primary-side switch circuit initiates the switching operation (e.g., start voltage 16V), a voltage at which the primary-side switch circuit stops the switching operation (e.g., stop voltage of 10 V), and a maximum applied voltage (e.g., 30 V) for preventing the breakdown of the power supply control IC are defined. Thus, the switching power supply circuit includes a constant voltage circuit (a transistor, a resistor, a diode, a constant voltage diode, etc.), for the purpose of preventing the breakdown of the power supply control IC, so that the bias voltage output from the auxiliary winding of the transformer is less than or equal to a constant voltage, (e.g., see Japanese Patent Laying-Open No. 2015-173043 (PTD 1), Japanese Patent Laying-Open No. H7-213053 (PTD 2)).

CITATION LIST

Patent Document

PTD 1: Japanese Patent Laying-Open No. 2015-173043
PTD 2: Japanese Patent Laying-Open No. H7-213053

SUMMARY OF INVENTION

Technical Problem

The constant voltage circuits disclosed in PTDs 1 and 2 can reduce an increased bias voltage and supply the reduced bias voltage to the power supply terminal of the power supply control IC (power control circuit).

However, the constant voltage circuit disclosed in PTD 1 is unable to control a decreased bias voltage and supply the controlled bias voltage to the power supply terminal of the power supply control IC. As a result, upon load short-circuit condition or overcurrent condition, the switching power supply circuit does not perform the intermittent operation until the bias voltage output from the auxiliary winding and rectified decreases to the stop voltage for the power supply control IC (power control circuit). This may overheat electronics components, and the power supply circuit may fail.

Solution to Problem

The present invention includes: a first rectifying element connected to an alternating-current power supply; a first capacitor configured to smooth a direct-current voltage rectified by the first rectifying element; a transformer having a primary winding, a secondary winding, and an auxiliary winding; an activation resistor connected to a node between one end of the first capacitor and one end of the primary winding; a switching element configured to switch the direct-current voltage from the first capacitor to be supplied to the primary winding; a power control circuit configured to control the switching element; a second capacitor having one end connected to the activation resistor and a power supply terminal of the power control circuit; a current sense resistor configured to detect a magnitude of a primary current flow through the primary winding; a second rectifying element connected to the auxiliary winding; and a shut-down circuit configured to receive a bias voltage output from the second rectifying element, wherein when the bias voltage is greater than or equal to a set voltage, the shut-down circuit outputs a voltage based on the bias voltage to the power supply terminal, and when the bias voltage is less than the set voltage, the shut-down circuit stops supply of power to the power supply terminal. The power control circuit is configured to: control a ratio of on-time to a switching cycle of the switching element, based on a current sensing voltage generated at the current sense resistor; and cause the switching operation of the switching element to stop when the voltage at the power supply terminal decreases to a stop voltage or less.

Advantageous Effects of Invention

According to the present invention, the shut-down circuit stops supply of power to the power supply terminal when the bias voltage output from the auxiliary winding and rectified is less than the set voltage, and the power control circuit causes the switching element to stop the switching operation at a time the voltage at the power supply terminal decreases less than or equal to the stop voltage. This allows the switching operation of the switching element to be stopped even though the bias voltage is not reduced to the stop voltage for the power control circuit.

DESCRIPTION OF EMBODIMENTS

Figure 1:
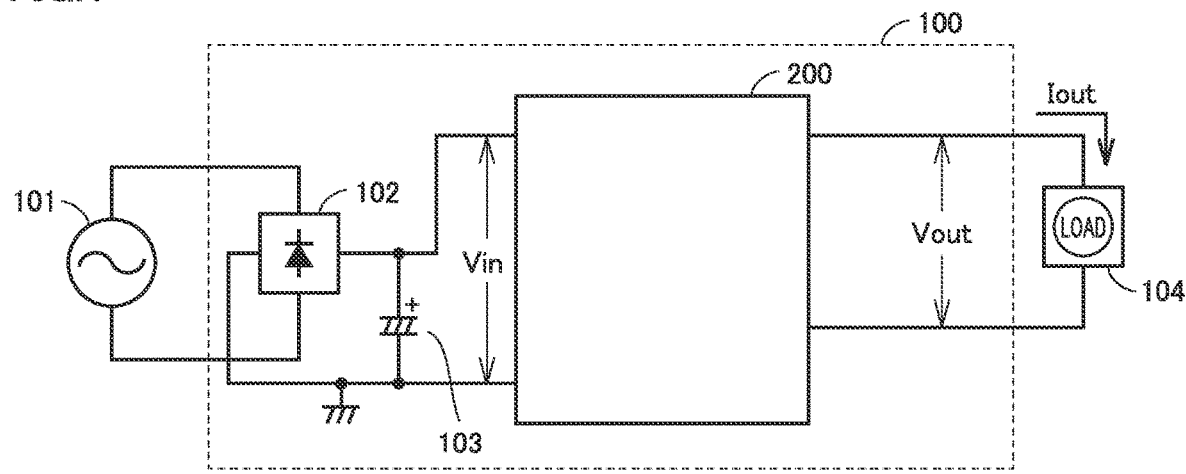
FIG. 1 is a diagram showing a configuration of a switching power supply circuit according to Embodiment 1, a commercial power supply, and a load.

First, problems with the background technologies are described in more detail.

As a switching power supply circuit is placed into a load short-circuit condition or overcurrent condition, electrical energy conveyed by a transformer (precisely, the transformer converts electrical energy into magnetic energy and vice versa) temporarily increases, and thus a voltage temporarily generated across an auxiliary winding increases. As the voltage across the auxiliary winding increases, a bias voltage increases. However, duration of the increase of the bias voltage is so short that the electrical energy is absorbed into a capacitor. Thus, the bias voltage will not increase to a point that can cause breakdown of the power supply control IC.

Further, according to PTD 1, the voltage to be supplied to the power supply control IC can be reduced by the constant voltage circuit.

For example, suppose that a design bias voltage is 18 V, and the bias voltage through the constant voltage circuit is 15 V. Even when the bias voltage temporarily increases (e.g., 35 V) due to the load short-circuit condition or overcurrent condition, the power supply terminal voltage of the power supply control IC is controlled to 15 V by the constant voltage circuit disclosed in PTD 1, thereby preventing the power supply terminal voltage from reaching a breakdown voltage of 30 V at which the power supply control IC is broken down.

Then, if the load short-circuit condition or overcurrent condition persists, a primary-side current sensing circuit operates in the switching power supply circuit and thereby the power supply control IC reduces the ON-Duty of the primary-side switching operation. This decreases the bias voltage. Then, when the power supply terminal voltage of the power supply control IC decreases to a stop voltage (e.g., 10 V) or less, the power supply control IC causes the primary-side switching operation to stop.

In such a conventional intermittent operation mode, when the power supply terminal voltage of the power supply control IC is in a range from the start voltage (e.g., 16V) to the stop voltage (e.g., 10 V), the switching power supply circuit repeatedly turns on and off, while receiving supply of a charging current from an activation resistor and a current from the bias voltage. In such an intermittent operation mode, components of the switching power supply circuit, including a semiconductor device, generate heat while the switching power supply circuit is in operation, and the components decrease in temperatures while the switching power supply circuit is stopped. For this reason, the components included in the switching power supply circuit repeat generating heat and decreasing in temperature. However, the components generate heat more than decreasing in temperature. Thus, the temperature gradually increases, and saturates at a certain temperature over time.

In the conventional intermittent operation mode, the repetitive cycle of turning on and off of the switching power supply depends on: a charging current dependent on an input voltage and an activation resistance value; a voltage (hysteresis voltage) indicating a difference between the start voltage and the stop voltage for the power supply control IC; a capacitance value of the capacitor connected to the power supply terminal of the power supply control IC; and the bias voltage supplied from the auxiliary winding of the transformer.

The charging current (approximately equal to the input voltage divided by the activation resistance value) depending on the input voltage and the activation resistance value is about a few tenths of a milliampere to about a few milliamperes. A current supplied to the power supply control IC from the bias voltage, which is dependent on a value of a voltage charged at the capacitor while the switching power supply circuit is in operation is a few tens of milliamperes. A current used by the power supply control IC to drive the semiconductor device is a few tens of milliamperes. Consequently, without the supply of the current from the bias voltage generated from the auxiliary winding, the power supply control IC is unable to continue to drive the semiconductor device.

The constant voltage circuit disclosed in PTD 1 outputs a constant voltage value (equal to the set voltage minus 0.5 V) if the bias voltage is higher than a set voltage (Zener voltage) for a Zener diode. On the other hand, if the bias voltage is lower than the set voltage of the Zener diode, the constant voltage circuit outputs a variable voltage value (equal to the bias voltage minus 0.5 V) and applies it to the power supply terminal of the power supply control IC. In the load short-circuit condition or overcurrent condition, ON-Duty of a PWM signal is small. Thus, the bias voltage supplied from the auxiliary winding decreases. For this reason, the voltage charged at the capacitor connected to the power supply terminal of the power supply control IC gradually decreases as well.

However, a problem with the switching power supply circuit is that it continues to operate until the voltage value at the power supply terminal of the power supply control IC (=the charging voltage of the capacitor connected to the power supply terminal) decreases to the power supply control IC operation stop voltage.

Furthermore, depending on the level of coupling between the windings in the transformer, there is a case where, even upon the load short-circuit condition or overcurrent condition, an amount of decrease of the bias voltage supplied from the auxiliary winding is too small to go below the power supply control IC operation stop voltage and the bias voltage is held at a voltage higher than the power supply control IC operation stop voltage, and, consequently, the switching power supply circuit does not enter the intermittent operation. In such a situation, the switching power supply circuit continues to operate, and the temperatures of the components included in the switching power supply circuit continue to increase even higher, which may cause the switching power supply circuit to fail.

Hereinafter, embodiments according to the present invention are described, with reference to the accompanying drawings.

Embodiment 1

FIG. 1 is a diagram showing a configuration of a switching power supply circuit 100 according to Embodiment 1, a commercial power supply 101, and a load 104.

Commercial power supply 101 is an alternating-current (AC) commercial power supply, for example. Alternatively, commercial power supply 101 may be a direct-current (DC) voltage source having a preceding power supply circuit, or a DC voltage source using, for example, a battery or a cell. Switching power supply circuit 100 receives an AC voltage from commercial power supply 101, and supplies an output voltage to load 104. Load 104 is connected to an output of switching power supply circuit 100, and operates using power from switching power supply circuit 100.

Switching power supply circuit 100 includes a rectifying element 102, a capacitor 103, and a power converter circuit 200. Switching power supply circuit 100 is, for example, an isolated flyback converter.

Rectifying element 102 is connected to commercial power supply 101. Rectifying element 102 rectifies the AC voltage, supplied from commercial power supply 101, into a (pulsating) DC voltage. Rectifying element 102 includes a diode bridge.

Capacitor 103 charges the (pulsating) DC voltage obtained by the rectification by rectifying element 102, thereby smoothing the pulsating DC voltage and storing a DC voltage Vin.

Power converter circuit 200 performs power conversion on the DC voltage Vin charged at capacitor 103 (DC voltage, or pulsating DC voltage. Referred also to as an input voltage) when DC voltage Vin is isolated, into a desired DC output voltage Vout.

As such, switching power supply circuit 100 converts the AC voltage from commercial power supply 101 into DC voltage Vin, and supplies a desired power (output voltage Vout×output current Iout) to load 104.

Thus, in order to supply load 104 with the desired power (design maximum power) from AC commercial power supply 101, rectifying element 102, capacitor 103, and power converter circuit 200 are necessary. On the other hand, in order to supply load 104 with a desired power (design maximum power) from a DC power supply, only power converter circuit 200 is necessary.

As a result, the design maximum powers dealt with by switching power supply circuit 100 and power converter circuit 200 have the same power value.

Here, output current Iout has a value less than or equal to a current value IoutR that can be output by power converter circuit 200 and switching power supply circuit 100 by design. The overcurrent condition is a condition in which power converter circuit 200 and switching power supply circuit 100 output a current exceeding the current value IoutR that they can output by design, in other words, a condition in which load 104 attempts to pass therethrough a current greater than the current value IoutR that load 104 can output by design.

For example, assuming that the design maximum power and output voltage Vout for power converter circuit 200 and switching power supply circuit 100 are 50 W and 5 V, respectively, output current Iout is in a range from 0 to 10 A. The overcurrent condition is where output current Iout exceeds 10 A (=IoutR). For example, assuming that the rated current value of a design output current Iout (=5 A) is 100%, the overcurrent condition is where the rated current value is greater than 10 A.

A load short-circuit condition is a condition in which a circuit or a wire trace, load 104, etc. subsequent to the output terminals of power converter circuit 200 and switching power supply circuit 100 is short circuited (electrically shorted). In this case, due to the short-circuit (since the impedance on the load side is inconstant), how many times the rated current the output current Iout would flow is unknown.

Overvoltage of the output voltage (e.g., the voltage changes from 5 V to 6 V or 20 V, etc.) is naturally inhibited unless a feedback (F/B) circuit 119 fails. Thus, description thereof is not provided in the present embodiment.

A condition in which output voltage Vout decreases lower than a design output voltage VoutR (=5 V), that is, a condition in which supply of power from the primary side is limited and thus the output voltage is decreased, is referred to as a decrease of output voltage Vout.

Due to the fact that power converter circuit 200 and switching power supply circuit 100 cannot output power more than the design maximum power, the decrease of output voltage Vout appears as what is called an "inverted V-shaped" characteristics attributed to the performance of a flyback power supply circuit when using the power supplied from the primary side.

The "inverted V-shaped" characteristics exhibit a decrease of the output voltage with a gradual increase of output current. For example, in a situation where the output power is 5 V/10 A where the rated power is 50 W, and a more current is output, that is, in an overcurrent condition, the output power changes to, for example, 4.0 V/12.5 A, 2.5 V/20 A, and so on. The "inverted V-shaped" characteristics are not accurately controllable, and depend on the performance of the flyback power supply circuit.

Figure 2:
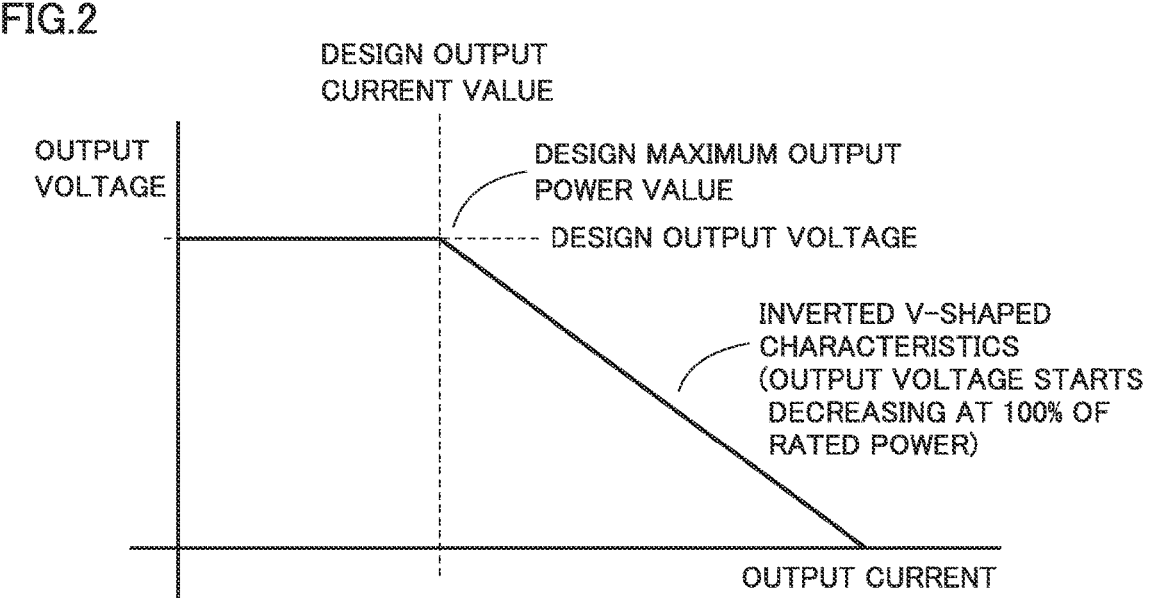
FIG. 2 is a diagram representing an output current versus an output voltage, exhibiting an "inverted V-shaped" characteristics when rated power exceeds 100%.

FIG. 2 is a diagram representing the output current versus the output voltage, exhibiting the "inverted V-shaped" characteristics when the rated power exceeds 100%. In the "inverted V-shaped" characteristics, the output voltage does not begin to decrease until an output current that is greater than the output current according to the rated power is output.

Figure 3:
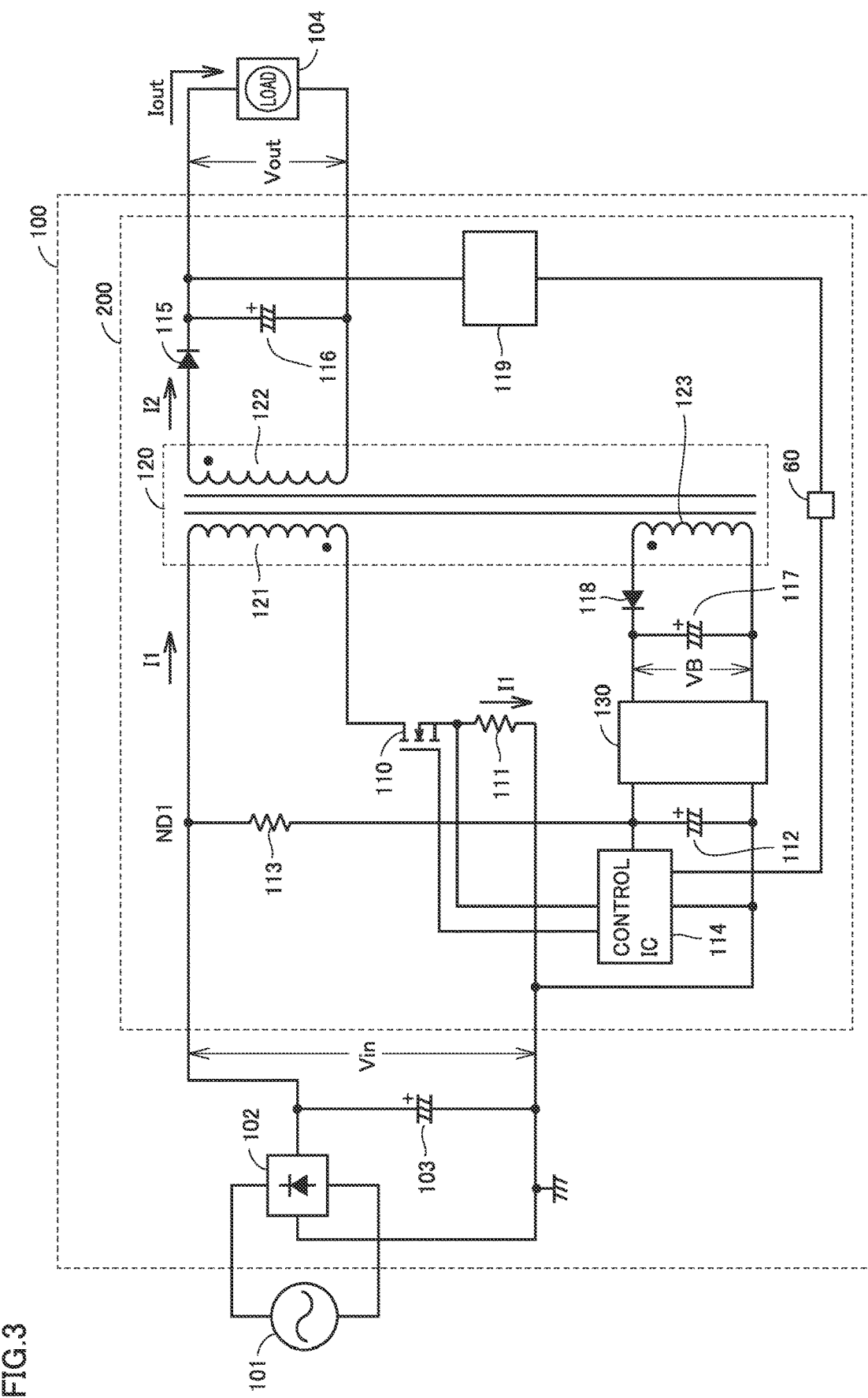
FIG. 3 is a diagram representing a detailed circuit structure of a power converter circuit in FIG. 1.

FIG. 3 is a diagram representing a detailed circuit structure of power converter circuit 200 in FIG. 1.

Power converter circuit 200 converts DC voltage Vin (DC voltage, or pulsating DC voltage), smoothed by and stored at capacitor 103, into output voltage Vout.

Power converter circuit 200 includes a switching element 110, a current sense resistor 111, a power supply control IC 114, a transformer 120, a rectifying element 115, a capacitor 116, F/B circuit 119, a shut-down circuit 130, transformer 120, a capacitor 112, capacitor 117, and a rectifying element 118.

Transformer 120 has a primary winding 121, a secondary winding 122, and an auxiliary winding 123. While primary winding 121 and secondary winding 122 are magnetically coupled and primary winding 121 and auxiliary winding 123 are magnetically coupled, they are electrically isolated from each other. As a result, transformer 120 in isolated switching power supply circuit 100 has a role of isolating the primary side (the commercial power supply side, the input side) and the secondary side (isolated side, output side) from each other.

The primary side includes rectifying element 102, capacitor 103, an activation resistor 113, a switching element 110, current sense resistor 111, capacitor 112, power supply control IC 114, primary winding 121, auxiliary winding 123, rectifying element 118, capacitor 117, and shut-down circuit 130. The secondary side includes secondary winding 122, rectifying element 115, capacitor 116, and F/B circuit 119.

Switching element 110 is configured of a metal oxide semiconductor field effect transistor (MOSFET). Rectifying elements 102, 115, 118 are configured of diodes.

Activation resistor 113 is connected to a node ND1 between one end of capacitor 103 and one end of primary winding 121.

Switching element 110 switches on and off the supply of DC voltage Vin from capacitor 103 to primary winding 121.

Power supply control IC 114 controls switching element 110.

Capacitor 112 has one end connected to activation resistor 113 and a power supply terminal T1 of power supply control IC 114.

Current sense resistor 111 is connected to switching element 110. Current sense resistor 111 detects a magnitude of a primary current I1 flow through primary winding 121.

Rectifying element 118 is connected to auxiliary winding 123.

Rectifying element 115 is connected to secondary winding 122.

Capacitor 116 is connected to rectifying element 115, and smoothes the output voltage.

F/B circuit 119 outputs a signal representing a relationship in magnitude between the output voltage smoothed by capacitor 116 and a desired constant voltage.

Power supply control IC 114 controls a ratio of on-time of switching element 110 to the switching cycle, based on a current sensing voltage generated at current sense resistor 111, and a signal from F/B circuit 119.

Shut-down circuit 130 receives a bias voltage VB output from rectifying element 118. If bias voltage VB is greater than or equal to a set voltage, shut-down circuit 130 outputs, to power supply terminal T1 of power supply control IC 114, a voltage that is based on bias voltage VB. If bias voltage VB is less than the set voltage, shut-down circuit 130 stops the supply of power to power supply terminal T1 of the power supply control IC.

Power supply control IC 114 causes switching element 110 to stop the switching operation when a voltage at power supply terminal T1 of power supply control IC 114 decreases less than or equal to a stop voltage.

Power converter circuit 200 according to the present embodiment includes shut-down circuit 130, whereas the power converter circuit disclosed in PTD 1 includes the constant voltage circuit, instead of shut-down circuit 130. An operation of the constant voltage circuit is described first.

Figure 4:
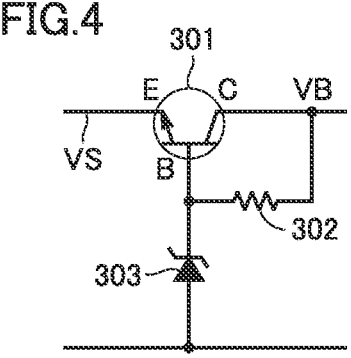
FIG. 4 is a diagram representing a constant voltage circuit disclosed in PTD 1.

FIG. 4 is a diagram representing the constant voltage circuit disclosed in PTD 1.

The constant voltage circuit includes an NPN transistor 301, a voltage supply resistor 302, and a Zener diode (low-voltage diode) 303.

Zener diode 303 is a constant voltage diode. As a constant voltage (which is referred to as the set voltage or Zener voltage) is applied to Zener diode 303, Zener diode 303 passes current therethrough.

Suppose that the set voltage for Zener diode 303 is 15 V, and a collector-emitter voltage VCE for NPN transistor 301 is 0.5 V.

When bias voltage VB is greater than or equal to 15 V, Zener diode 303 turns on, which turns on NPN transistor 301. The output voltage of the constant voltage circuit is Zener diode 303's set voltage of 15 V minus a base-emitter voltage VBE (=0.5 V) of NPN transistor 301, that is, 15 V−0.5 V=14.5 V.

When bias voltage VB is less than 15 V (e.g., 14.4 V), Zener diode 303 does not turn on. However, bias voltage VB is supplied to base B of NPN transistor 301 via voltage supply resistor 302, which turns on NPN transistor 301. The output voltage of the constant voltage circuit is 14.4 V minus voltage VBE (=0.5 V), that is, 14.4 V−0.5 V=13.9 V.

As the above, it can be seen that the set voltage of Zener diode 303 limits the upper limit for the output voltage of the constant voltage circuit, but does not control the lower limit for the output voltage of the constant voltage circuit.

Figure 5:
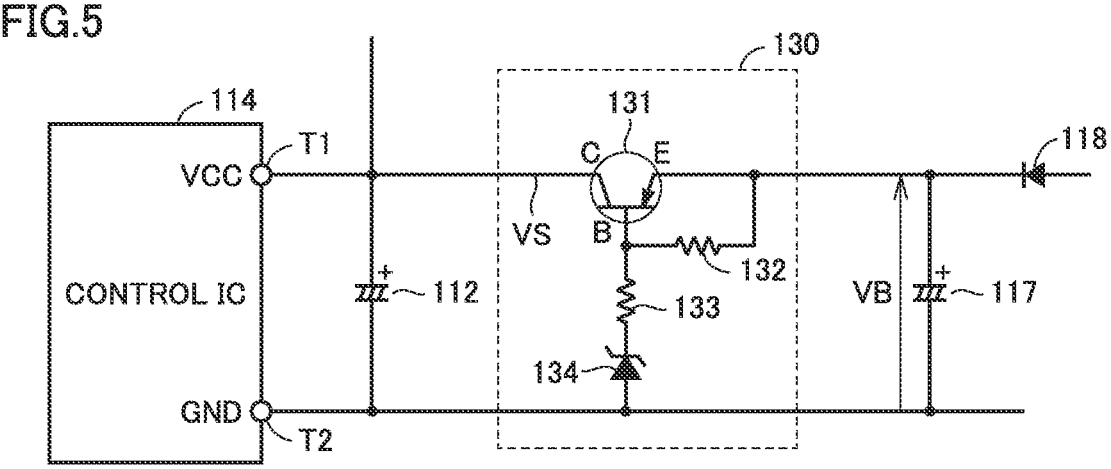
FIG. 5 is a diagram representing an example configuration of a shut-down circuit included in FIG. 3.

FIG. 5 is a diagram representing an example configuration of shut-down circuit 130 included in FIG. 3.

Shut-down circuit 130 includes a PNP transistor 131, a voltage supply resistor 132, an adjustment resistor 133, and a Zener diode 134.

PNP transistor 131 has an emitter E connected to the output of rectifying element 118, a collector C connected to power supply terminal T1 of power supply control IC 114, and a base B.

Adjustment resistor 133 and Zener diode are connected in series between base B of PNP transistor 131 and the ground.

Voltage supply resistor 132 is disposed between the output of rectifying element 118 and base B of PNP transistor 131.

Similarly to the constant voltage circuit disclosed in PDL 1, suppose that a set voltage (Zener voltage) for Zener diode 134 is 15 V, and a voltage VCE of PNP transistor 131 is 0.5 V.

Voltage supply resistor 132 supplies base B of PNP transistor 131 with bias voltage VB charged at capacitor 117. Adjustment resistor 133 is a resistor for adjusting a current flow through Zener diode 134.

When bias voltage VB is greater than or equal to 15 V (set voltage), Zener diode 134 turns on, which turns on PNP transistor 131 and (bias voltage VB minus VCB voltage) is output to collector C of PNP transistor 131.

When bias voltage VB is less than 15 V (set voltage), Zener diode 134 does not turn on and PNP transistor 131 is off. Consequently, no voltage is output to collector C of PNP transistor 131. In other words, the set voltage of Zener diode 303 does not control the upper limit for the output voltage of shut-down circuit 130, but limits the lower limit for the output voltage of shut-down circuit 130.

As PNP transistor 131 turns on, capacitor 112 is charged with bias voltage VB. As PNP transistor 131 turns off, capacitor 112 is not charged with bias voltage VB.

On the other hand, capacitor 112 is charged with DC voltage Vin stored at capacitor 103 via activation resistor 113, independent of the operation of shut-down circuit 130. However, the charging current via activation resistor 113 is far less than the charging current from bias voltage VB. Consequently, power supply control IC 114 is unable to continue to drive switching element 110, using the charging current via activation resistor 113 only.

As a voltage VCC at power supply terminal T1 changes to a start voltage of 16 V, power supply control IC 114 outputs a PWM signal to switching element 110. As the voltage VCC at power supply terminal T1 changes to the stop voltage of 10 V, power supply control IC 114 stops outputting the PWM signal. In other words, in order for switching power supply circuit 100 to continue the switching operation and continue to output a desired output voltage, the following processing needs to be continued.

Capacitor 112 is charged, via activation resistor 113, with DC voltage Vin stored at capacitor 103, and voltage VCC at power supply terminal T1 of power supply control IC 114 reaches the start voltage of 16V. This causes power supply control IC 114 to output the PWM signal, and switching element 110 performs the switching operation according to the PWM signal. Transformer 120 conveys electromagnetic energy between primary winding 121 and secondary winding 122 and between primary winding 121 and auxiliary winding 123, rectifying element 118 rectifies a voltage generated at auxiliary winding 123, the voltage is charged at capacitor 117, and bias voltage VB is generated at capacitor 117. Capacitor 112 connected to power supply terminal T1 of power supply control IC 114 is charged with bias voltage VB via shut-down circuit 130 before voltage VCC at power supply terminal T1 of power supply control IC 114 decreases to the stop voltage of 10 V, thereby continuing to maintain voltage VCC at power supply terminal T1 of power supply control IC 114 at 10 V or greater.

(Operation within Maximum Power)

In the following, description is given where, for example, power converter circuit 200 operates normally, within the design maximum power of 50 W.

Referring to FIG. 3, the AC voltage supplied from commercial power supply 101 is converted into a (pulsating) DC voltage by passing through rectifying element 102. Capacitor 103 smoothes the (pulsating) DC voltage passed through rectifying element 102 to generate DC voltage Vin (DC voltage, or pulsating DC voltage), and store DC voltage Vin.

Switching element 110 performs the switching operation, based on the PWM signal transmitted from power supply control IC 114. Suppose that a design switching frequency is 100 KHz.

DC voltage Vin, which is obtained by the (pulsating) DC voltage passing through rectifying element 102 from AC commercial power supply 101 and stored at capacitor 103, charges capacitor 112 that is connected to power supply terminal T1 of power supply control IC 114 via activation resistor 113. Then, as voltage VCC at power supply terminal T1 of power supply control IC 114 reaches the start voltage of 16 V, power supply control IC 114 transmits to switching element 110 the PWM signal for driving the gate terminal of switching element 110, at a frequency of 100 KHz. Here, the PWM signal is a signal that is variable in pulse width with a context so that output voltage Vout is a target constant voltage (a signal that varies only in on-time per 100 KHz cycle, 10 usec).

DC voltage Vin stored at capacitor 103 is applied to primary winding 121 of transformer 120 on the primary side. As switching element 110 is driven by the PWM signal, switching element 110 changes to the on-state. As a result, primary current I1 flows through primary winding 121. Primary current I1 returns to capacitor 103 via current sense resistor 111, at which time the primary current I1 flows through current sense resistor 111 and thereby a voltage (hereinafter, referred to as a current sensing voltage Vi1) is generated. Current sensing voltage Vi1 is transmitted to power supply control IC 114.

Transformer 120 stores magnetic energy therein, by primary current I1 flowing through primary winding 121. Then, as the PWM signal from power supply control IC 114 is switched off, that is, as switching element 110 changes to the off-state, the magnetic energy stored inside the transformer 120 is conveyed as a secondary current I2 to secondary winding 122.

Secondary current I2 charges capacitor 116 via rectifying element 115. By the switching element 110 repeatedly switching on/off as such in response to the PWM signal, the power is conveyed from primary winding 121 to secondary winding 122.

The voltage charged at capacitor 116 gradually increases, which causes output voltage Vout to reach a desired output voltage VoutR over time.

F/B circuit 119 detects output voltage Vout. F/B circuit 119 transmits an F/B signal to power supply control IC 114 via a photo-coupler 60. The F/B signal is for controlling On width (duty ratio) of the PWM signal to be provided to switching element 110 so that output voltage Vout is a target output voltage VoutR.

For example, when desired output voltage VoutR is 5 V and the current output voltage Vout is 4.9 V, F/B circuit 119 transmits to power supply control IC 114 an F/B signal representing that output voltage Vout is lower than desired output voltage Vout, so that On width of the PWM signal is increased (the duty ratio is increased). When the current output voltage Vout is 5.1 V, F/B circuit 119 transmits to power supply control IC 114 an F/B representing that output voltage Vout is higher than a desired output voltage VoutR, so that the On width of the PWM signal is reduced (the duty ratio is reduced).

By controlling as such the width of the PWM signal which drives switching element 110, so that output voltage Vout is VoutR (=5.0 V), output voltage Vout is kept constant.

Based on the F/B signal transmitted from F/B circuit 119, power supply control IC 114 increases or decreases the On width (duty ratio) of the PWM signal, thereby driving switching element 110 so that output voltage Vout is the target output voltage VoutR.

The above processing allows power converter circuit 200 to supply load 104 with the current value Iout, while holding output voltage Vout at the target voltage value, insofar as the output power is within a design power value (VoutR×Iout).

When output voltage Vout is at desired voltage VoutR (=5 V), a design voltage is generated at auxiliary winding 123, and bias voltage VB (=18 V) having a desired magnitude is charged at capacitor 117.

In supplying bias voltage VB from auxiliary winding 123 of transformer 120, the bias voltage fluctuates depending on the winding structure of transformer 120. If the coupling of transformer 120 is high (good coupling between the windings), bias voltage VB decreases with a decrease of output voltage caused by overcurrent or load short-circuit. If the coupling of transformer 120 is low (poor coupling between the windings), on the other hand, bias voltage VB does not significantly decrease even if the output voltage decreases due to overcurrent or load short-circuit. The present embodiment assumes that bias voltage VB decreases following a decrease of output voltage Vout caused by overcurrent or load short-circuit. In other words, the present embodiment assumes high coupling of transformer 120.

Transformer 120 includes primary winding 121, secondary winding 122, and auxiliary winding 123. Transformer 120 is a flyback transformer, and thus it stores magnetic energy by passing current through primary winding 121, after which the transformer 120 discharges the stored magnetic energy as a current to secondary winding 122 and auxiliary winding 123.

At this time, the voltage generated at secondary winding 122 and the voltage generated at auxiliary winding 123 are proportional to the number of windings of secondary winding 122 and the number of windings of auxiliary winding 123. In other words, if secondary winding 122 is a 5 V design (its decrease by a forward voltage of the diode is considered), and auxiliary winding 123 is an 18 V design (its decrease by a forward voltage of the diode is considered), bias voltage VB is 18 V when output voltage Vout is 5 V.

As the bias voltage of 18 V is input to shut-down circuit 130, a voltage at Zener diode 134, connected to base B of PNP transistor 131 via adjustment resistor 133, exceeds the set voltage (=15 V) of Zener diode 134. Thus, a current flows through base B and then flows between collector C and emitter E of PNP transistor 131. This charges capacitor 112 connected to power supply terminal T1 of power supply control IC 114, and a voltage close to bias voltage VB is applied to power supply terminal T1. Strictly speaking, a voltage decreased from bias voltage VB by collector-emitter voltage VCE of PNP transistor 131 is applied to power supply terminal T1. In the present embodiment, the decrease of voltage VCE will not be described for convenience.

Within the design power value (=50 W), even if load 104 varies and output current Iout changes, power supply control IC 114 controls the width of the PWM signal according to the F/B signal from F/B circuit 119, thereby controlling the power to be conveyed from the primary side to the secondary side so that output voltage Vout is a constant voltage value. Thus, output voltage Vout is kept at the constant voltage value.

Figure 6:
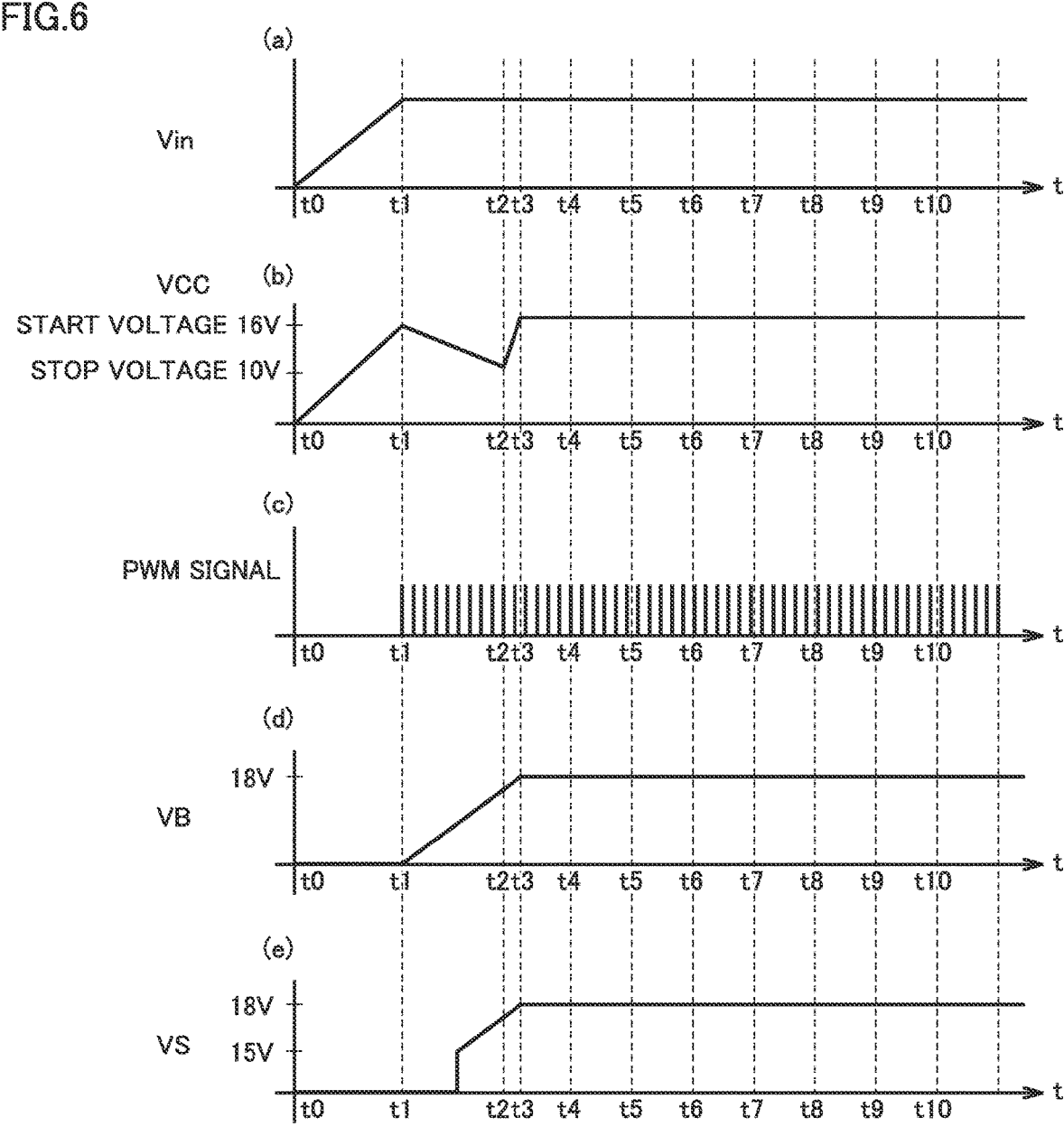
FIG. 6 is a diagram representing respective voltage waveforms when the switching power supply circuit according to Embodiment 1 is caused to operate at or less than a design power value (=50 W).

FIG. 6 is a diagram representing respective voltage waveforms when switching power supply circuit 100 according to Embodiment 1 is caused to operate at or less than the design power value (=50 W). In FIG. 6, elapse of time is indicated on the horizontal axis, and voltage is indicated on the vertical axis.

(1) Times t0 to t1

The AC voltage supplied from commercial power supply 101 is converted into the (pulsating) DC voltage by passing through rectifying element 102. Capacitor 103 smoothes the (pulsating) DC voltage passed through rectifying element 102, and generates and stores DC voltage Vin. DC voltage Vin gradually increases over time. With the increase of DC voltage Vin, charging current flows through capacitor 112 via activation resistor 113, and voltage VCC at power supply terminal T1 of power supply control IC 114 gradually increases. Voltage VCC has not reached the start voltage of 16 V yet.

Since voltage VCC has not reached the start voltage of 16 V yet, power supply control IC 114 does not output the PWM signal. Switching element 110 is not in the switching operation and thus bias voltage VB is 0 V. Since bias voltage VB is 0 V, output of shut-down circuit 130 is 0 V.

(2) Times t1 to t2

Voltage Vin stored at capacitor 103 remains at a constant value. Voltage VCC at power supply terminal T1 of power supply control IC 114 reaches the start voltage of 16 V. Thus, power supply control IC 114 outputs the PWM signal and drives switching element 110. As power supply control IC 114 begins outputting the PWM signal, voltage VCC at power supply terminal T1 decreases since the magnitude of charging current via activation resistor 113 is far less than the magnitude of current consumed to output the PWM signal.

As the PWM signal is output, the switching operation of switching element 110 passes a current through rectifying element 118 from auxiliary winding 123 of transformer 120 to capacitor 117, and bias voltage VB increases. If bias voltage VB is less than 15 V, a voltage VS output from shut-down circuit 130 is 0 V. If bias voltage VB increases greater than or equal to voltage VS output from shut-down circuit 130 is the same in magnitude as bias voltage VB.

(3) Times t2 to t3

Voltage Vin stored at capacitor 103 remains at the constant voltage. Supply of power from shut-down circuit 130 begins, and thus voltage VCC at power supply terminal T1 of power supply control IC 114 turns to increase. Voltage VCC does not decrease lower than the stop voltage (=10 V) and thus power supply control IC 114 keeps outputting the PWM signal. Bias voltage VB further increases and reaches its design value of 18 V. With the increase of bias voltage VB, an output voltage VS of shut-down circuit 130 increases, and reaches 18 V.

(4) Times t3 to t10

Voltage Vin stored at capacitor 103 remains at the constant voltage. Voltage VCC at power supply terminal T1 of power supply control IC 114 is maintained at output voltage VS (=18 V) of shut-down circuit 130. Power supply control IC 114 keeps outputting the PWM signal. As a result, bias voltage VB is maintained at 18 V, and output voltage VS of shut-down circuit 130, too, is maintained at 18 V.

(Operation Beyond Maximum Power)

Next, an operation of switching power supply circuit 100 is described where load 104 attempts to consume a current beyond the design maximum power (=50 W) of power converter circuit 200. In other words, an overcurrent condition, or a load short-circuit condition where a greater current flows through load 104 than in the overcurrent condition is assumed.

For example, suppose an overcurrent condition (e.g., 11 A) in which output current Iout is greater than 10 A. In this case, the output power of power converter circuit 200 is output voltage Vout×output current Iout, that is, 5 A×11 A=55 W. Thus, power exceeding the design maximum power of 50 W must be supplied to load 104. To that end, a current greater than primary current I1 that is used to output the maximum power of 50 W needs to be passed through the primary-side circuit. At this time, current sensing voltage Vi1 greater than when the maximum power is 50 W is generated at current sense resistor 111.

When current sensing voltage Vi1 generated at current sense resistor 111 is greater than a predetermined value for power supply control IC 114, power supply control IC 114 reduces ON-Duty of the PWM signal to reduce the primary current flow through current sense resistor 111. This limits the primary current. As the primary current is limited, power supplied from the primary side is limited to, generally, 50 W, ending up power converter circuit 200 failing to maintain desired output voltage VoutR (=5 V).

As described above, as output current Iout is increased greater than 10 A, output voltage Vout is decreased lower than desired voltage VoutR (=5 V). For example, when output voltage Vout of switching power supply circuit 100 is decreased to 4 V, bias voltage VB is decreased to 14.4 V since bias voltage VB is proportional to the winding turns ratio between secondary winding 122 and auxiliary winding 123 of transformer 120.

In PTD 1, the constant voltage circuit has a function of limiting a voltage to be input to power supply control IC 114 when bias voltage VB is greater than or equal to the set voltage of 15 V of the Zener diode. However, when bias voltage VB is less than the set voltage of 15 V, the constant voltage circuit supplies power supply terminal T1 of power supply control IC 114 with a voltage minus a voltage VBE at NPN transistor 301 (=0.5 V) (=14.4 V minus 0.5 V=13.9 V).

When voltage VCC at power supply terminal T1 of power supply control IC 114 is 13.9 V, voltage VCC is greater than the stop voltage of 10 V and thus switching power supply circuit 100 continues to operate, rather than entering the intermittent operation. Thus, the switching operation of switching power supply circuit continues. As a result, the electronics components included in switching power supply circuit 100 remain in continuous operation in overload state, ending up being heated, and resulting in failure.

In other words, in the load short-circuit condition or overcurrent condition in which output voltage Vout of 5 V is changed to 4 V, 13.9 V continues to be applied to power supply terminal T1 of the power supply control IC, due to which the switching operation of switching power supply circuit continues. Thus, the electronics components included in switching power supply circuit remain in continuous operation in overload state, ending up being heated, and resulting in failure.

According to shut-down circuit 130 of the present embodiment, in contrast, upon the load short-circuit condition or overcurrent condition, output voltage Vout of 5 V changes to 4 V, upon which the bias voltage VB decreases from 18 V to 14.4 V. As a result, bias voltage VB is less than the set voltage (=15 V) for Zener diode 134. In this case, PNP transistor 131 turns off and no bias voltage VB is output to collector C of PNP transistor 131. Power supply terminal T1 of power supply control IC 114 is unable to receive supply of a current from bias voltage and thus VB Voltage VCC at power supply terminal T1 rapidly decreases lower than the stop voltage of 10 V for power supply control IC 114. As a result, switching power supply circuit 100 stops the switching operation.

Then, capacitor 117 is charged with DC voltage Vin stored at capacitor 103 via activation resistor 113. As voltage VCC at power supply terminal T1 of power supply control IC 114 reaches the start voltage of 16 V, the PWM signal for driving switching element 110 is again output from power supply control IC 114. As the PWM signal is output, the switching operation resumes. However, due to the load short-circuit condition or overcurrent condition, ON-Duty of the PWM signal is immediately reduced. This prevents output voltage Vout from increasing to desired voltage VoutR and bias voltage VB from increasing to a desired voltage. Thus, voltage VCC at power supply terminal T1 of power supply control IC 114 decreases lower than the stop voltage of 10 V over time. As a result, switching power supply circuit 100 stops the switching operation again.

Charging current via the activation resistor is far less than the current supplied from the bias voltage. Consequently, power supply control IC 114 is unable to hold the voltage at the power supply terminal, using charging current via activation resistor 113. As a result, even though the voltage at the power supply terminal increases to the start voltage, it decreases to the stop voltage again.

The intermittent operation is performed in which the switching operation is repeatedly stops and resumes as such.

Thus, upon the load short-circuit condition or overcurrent condition, compared to switching power supply circuit, which includes the constant voltage circuit according to PTD 1, remaining in continuous operation, switching power supply circuit 100, which includes shut-down circuit 130 according to the present embodiment, performs the intermittent operation. Thus, switching power supply circuit 100 according to the present embodiment allows for reduction in percentage of the operation of power supply control IC 114 per unit time. As a result, the amount of heat generated from electronics components included in switching power supply circuit can be reduced, and failure of switching power supply circuit can be prevented as compared to switching power supply circuit without shut-down circuit 130.

Figure 7:
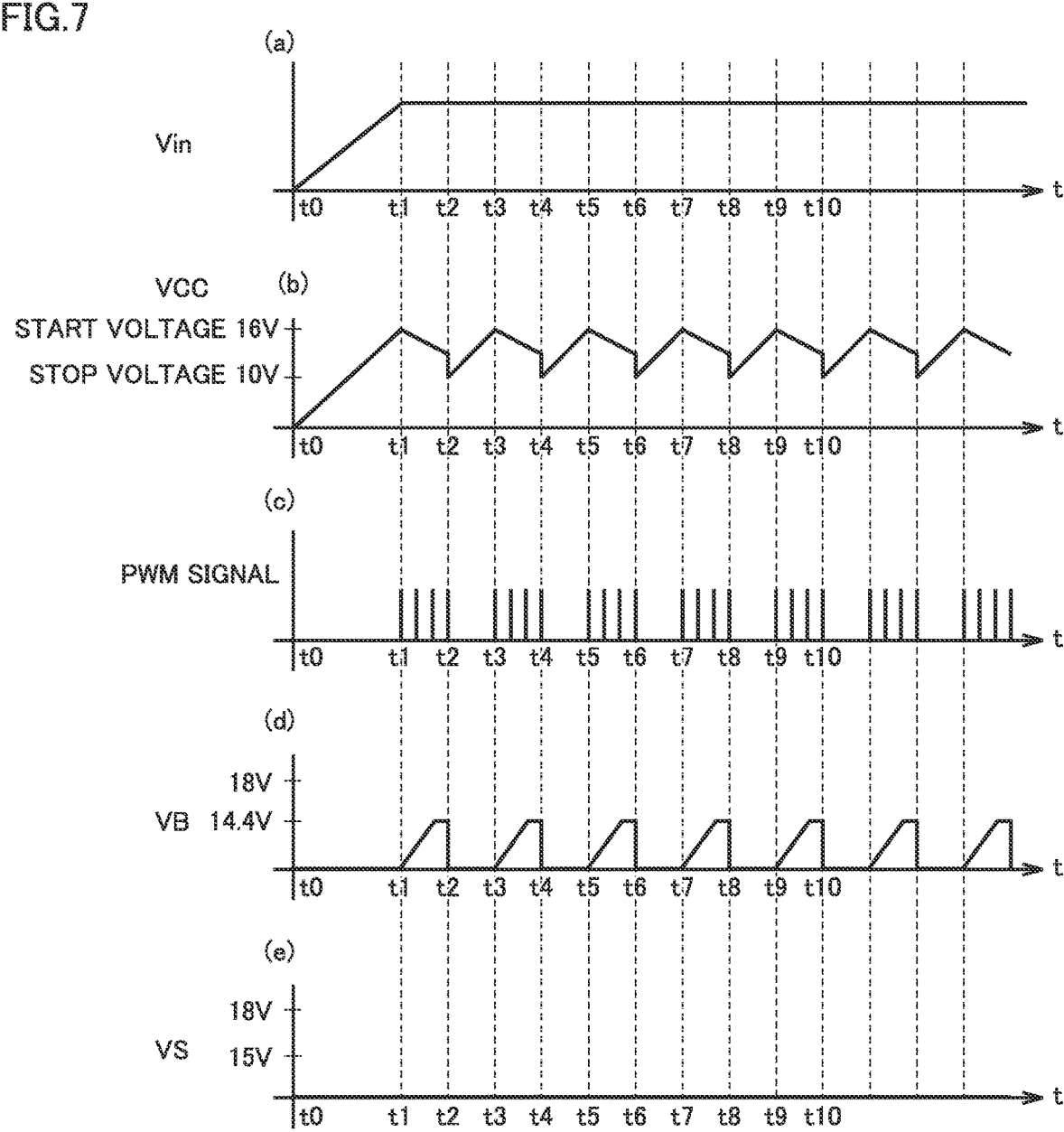
FIG. 7 is a diagram representing the respective voltage waveforms when the switching power supply circuit according to Embodiment 1 is caused to operate at a design power value (=50 W) or greater, in a load short-circuit condition or overcurrent condition.

FIG. 7 is a diagram representing respective voltage waveforms when switching power supply circuit 100 according to Embodiment 1 is caused to operate at the design power value (=50 W) or greater, in the load short-circuit condition or overcurrent condition. In FIG. 7, elapse of time is indicated on the horizontal axis, and voltage is indicated on the vertical axis.

(1) Times t0 to t1

The AC voltage supplied from commercial power supply 101 is converted into a (pulsating) DC voltage by passing through rectifying element 102. Capacitor 103 smoothes the (pulsating) DC voltage passed through rectifying element 102, and generates and stores DC voltage Vin. DC voltage Vin gradually increases over time. With the increase of DC voltage Vin, charging current flows through capacitor 112 via activation resistor 113, and voltage VCC at power supply terminal T1 of power supply control IC 114 gradually increases. Voltage VCC has not reached the start voltage of 16 V yet.

Since voltage VCC has not reached the start voltage of 16 V yet, power supply control IC 114 does not output the PWM signal. Switching element 110 is not in the switching operation and thus bias voltage VB is 0 V. Since bias voltage VB is 0 V, output voltage VS of shut-down circuit 130 is 0 V.

(2) Times t1 to t2

Voltage Vin stored at capacitor 103 remains at a constant value. Voltage VCC at power supply terminal T1 of power supply control IC 114 reaches the start voltage of 16 V. Thus, power supply control IC 114 outputs the PWM signal and drives switching element 110. As power supply control IC 114 begins outputting the PWM signal, voltage VCC decreases since the magnitude of charging current via activation resistor 113 is far less than the magnitude of current consumed to output the PWM signal.

As the PWM signal is output, the switching operation of switching element 110 passes a current through rectifying element 118 from auxiliary winding 123 of transformer 120 to capacitor 117, and bias voltage VB increases. However, due to the load short-circuit condition, output voltage Vout only increases to 4 V. For this reason, bias voltage VB only increases to 14.4 V. Since bias voltage VB is less than 15 V, output voltage VS of shut-down circuit 130 is 0 V. At time t2, voltage VCC at power supply terminal T1 reaches the stop voltage of 10 V.

(3) Times t2 to t3

Voltage Vin stored at capacitor 103 remains at a constant voltage. Voltage VCC at power supply terminal T1 of power supply control IC 114 is charged via activation resistor 113, and begins increasing again. Voltage VCC has not reached the start voltage of 16 V yet, and thus power supply control IC 114 does not output the PWM signal. Switching element 110 is not performing the switching operation, and thus bias voltage VB remains 0 V. Since bias voltage VB is 0 V, output voltage VS of shut-down circuit 130 is 0 V. At time t3, voltage VCC at power supply terminal T1 reaches the start voltage of 16 V.

Switching power supply circuit 100 thereafter performs the intermittent operation in which switching element 110 repeatedly performs the switching operation at times t1 to t2 and stops the switching operation at times t2 to t3.

Next, the load short-circuit condition or overcurrent condition in which output voltage Vout of 5 V is changed from 2.5 V is considered. In this case, bias voltage VB decreases from 18 V to 9 V. This changes output voltage VS of shut-down circuit 130 according to the present embodiment to 0 V, and changes the output voltage of the constant voltage circuit disclosed in PTD 1 to 8.5 V (=9 V−0.5 V). Both the circuits have the output voltages lower than the stop voltage (=10 V) for the power supply control IC, and thus enter the intermittent operation.

However, the constant voltage circuit disclosed in PTD 1 and shut-down circuit 130 according to the present embodiment are different in bias voltage VB which is stopped by switching power supply circuit. A condition for switching power supply circuit 100 to stop is that bias voltage VB is 15 V in shut-down circuit 130 according to the present embodiment, while bias voltage VB is 9.5 V in the constant voltage circuit disclosed in PTD 1. Such a difference leads to the following differences.

For the constant voltage circuit disclosed in PTD 1, in the load short-circuit condition or overcurrent condition, switching power supply circuit 100 continues the switching operation until bias voltage VB decreases from 18 V to 10.5 V. In contrast, for shut-down circuit 130 according to the present embodiment, in the load short-circuit condition or overcurrent condition, switching power supply circuit 100 stops the switching operation when bias voltage VB only decreases from 18 V to 15 V. This reduces the duration in which the electronics components included in switching power supply circuit 100 according to Embodiment 1 are overloaded, thereby preventing a failure of switching power supply circuit 100 according to Embodiment 1 due to heat, as compared to switching power supply circuit which includes the constant voltage circuit disclosed in PTD 1 mounted thereon.

In the present embodiment, shut-down circuit 130 (which includes a resistor, a transistor, a diode, and a constant voltage diode) is connected between bias voltage VB and the power supply terminal of power supply control IC 114. Owing to this, in the load short-circuit condition or overcurrent condition, bias voltage VB obtained by rectifying the voltage generated at auxiliary winding 123 decreases in proportional to a decrease of output voltage Vout, and output voltage VS of shut-down circuit 130 changes to 0 V at a moment the bias voltage VB has decreased to the set voltage (a constant voltage of the constant voltage diode) for shut-down circuit 130. This stops the supply of bias voltage VB to power supply terminal T1 of power supply control IC 114.

Power supply terminal T1 of power supply control IC 114 is unable to receive the supply of power from bias voltage VB, and thus voltage VCC at power supply terminal T1 rapidly decreases. As voltage VCC decreases lower than the stop voltage for power supply control IC 114, power supply control IC 114 stops the primary-side switching operation. This allows switching power supply circuit 100 to stop earlier in time than bias voltage VB can decrease to the stop voltage for power supply control IC 114. Without shut-down circuit 130, bias voltage VB does not stop until it reaches the stop voltage of 10 V. With shut-down circuit 130, switching power supply circuit 100 stops at a moment bias voltage VB decreases less than or equal to 15 V.

Embodiment 2

Figure 8:
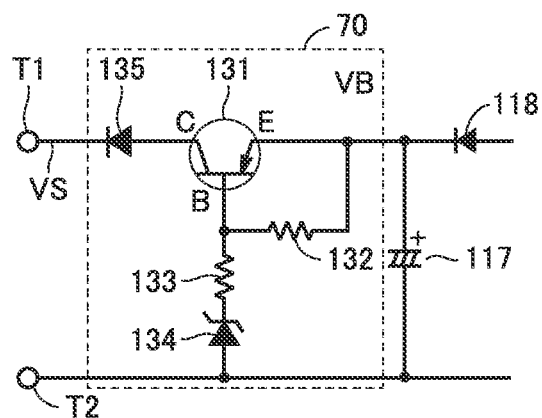
FIG. 8 is a diagram representing a configuration of a shut-down circuit according to Embodiment 2.

FIG. 8 is a diagram representing a configuration of a shut-down circuit according to Embodiment 2.

A shut-down circuit 70 according to Embodiment 2 includes a rectifying element 135, in addition to the components included in shut-down circuit 130 according to Embodiment 1. In other words, shut-down circuit 70 includes PNP transistor 131, adjustment resistor 133, Zener diode 134, voltage supply resistor 132, and rectifying element (diode) 135.

PNP transistor 131 has an emitter E connected to an output of rectifying element 118, a collector C connected to an anode of a diode 135, and a base B.

Adjustment resistor 133 and the Zener diode are connected in series between base B of PNP transistor 131 and the ground.

Voltage supply resistor 132 is disposed between the output of rectifying element 118 and base B of PNP transistor 131.

The anode of diode 135 is connected to collector C of PNP transistor 131. A cathode of diode 135 is connected to a power supply terminal T1 of a power supply control IC 114.

The addition of diode 135 can prevent a voltage from being applied to PNP transistor 131 when PNP transistor 131 is off. The addition of diode 135 can protect shut-down circuit 130. As a result, a failure of a switching power supply circuit can be prevented even in a load short-circuit condition or overcurrent condition.

Embodiment 3

Figure 9:
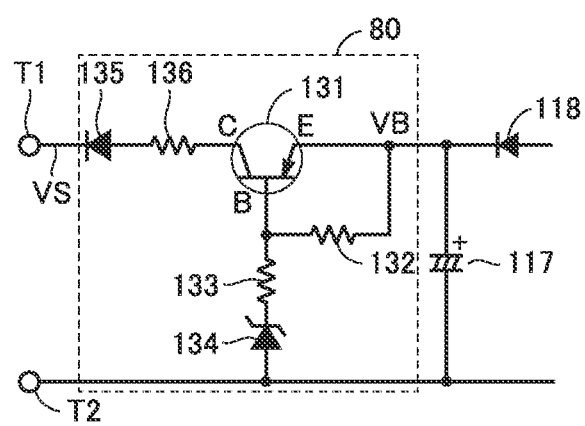
FIG. 9 is a diagram representing a configuration of a shut-down circuit according to Embodiment 3.

FIG. 9 is a diagram representing a configuration of a shut-down circuit according to Embodiment 3.

A shut-down circuit 80 according to Embodiment 3 includes a resistor 136, in addition to the components of shut-down circuit 70 according to Embodiment 2. In other words, shut-down circuit 80 includes PNP transistor 131, adjustment resistor 133, Zener diode 134, voltage supply resistor 132, rectifying element (diode) 135, and adjustment resistor 136.

PNP transistor 131 has an emitter E connected to an output of rectifying element 118, a collector C connected to one end of adjustment resistor 136, and a base B.

Adjustment resistor 133 and the Zener diode are connected in series between base B of PNP transistor 131 and the ground.

Voltage supply resistor 132 is disposed between the output of rectifying element 118 and base B of PNP transistor 131.

Adjustment resistor 136 has one end connected to collector C of PNP transistor 131, and another end connected to a power supply terminal T1 of a power supply control IC 114.

Diode 135 has an anode connected to the other end of adjustment resistor 136. Diode 135 has a cathode connected to power supply terminal T1 of power supply control IC 114.

The addition of adjustment resistor 136 allows a current flow between the collector and emitter of PNP transistor 131 to be adjusted when PNP transistor 131 is on. This allows adjustment of the duration of operation of switching power supply circuit 100 when switching power supply circuit 100 performs the intermittent operation in the load short-circuit condition or overcurrent condition. As a result, switching power supply circuit 100 is able to prevent abnormal overheat upon the load short-circuit condition or overcurrent condition, thereby preventing a failure of switching power supply circuit 100.

The embodiments presently disclosed should be considered in all aspects illustrative and not restrictive. The scope of the present invention is defined by the appended claims, rather than by the above description. All changes which come within the meaning and range of equivalency of the appended claims are to be embraced within their scope.

REFERENCE SIGNS LIST 60 photo-coupler; 100 switching power supply circuit; 101 commercial power supply; 102, 115, 118, 135 rectifying element; 103, 112, 116, 117 capacitor; 104 load; 110 switching element; 111 the current sense resistor; 113 activation resistor; 114 power supply control IC; 119 F/B circuit; 120 transformer; 121 primary winding; 122 secondary winding; 123 auxiliary winding; 70, 80, 130 shut-down circuit; 131 PNP transistor; 132, 302 voltage supply resistor, 133, 136 adjustment resistor; 134, 303 Zener diode; 200 power converter circuit; and 301 NPN transistor.

The invention claimed is:

1. A switching power supply circuit, comprising:
a first rectifying element connected to an alternating-current power supply;
a first capacitor configured to smooth a direct-current voltage rectified by the first rectifying element;
a transformer having a primary winding, a secondary winding, and an auxiliary winding;
an activation resistor connected to a node between one end of the first capacitor and one end of the primary winding;
a switching element configured to switch the direct-current voltage from the first capacitor to be supplied to the primary winding;
a power control circuit configured to control the switching element;
a second capacitor having one end connected to the activation resistor and a power supply terminal of the power control circuit;
a current sense resistor configured to detect a magnitude of a primary current flow through the primary winding;
a second rectifying element connected to the auxiliary winding; and
a shut-down circuit configured to receive a bias voltage output from the second rectifying element, wherein when the bias voltage is greater than or equal to a set voltage, the shut-down circuit outputs a voltage based on the bias voltage to the power supply terminal, and when the bias voltage is less than the set voltage, the shut-down circuit stops supply of power to the power supply terminal,
the power control circuit being configured to:
control a ratio of on-time to a switching cycle of the switching element, based on a current sensing voltage generated at the current sense resistor; and
cause the switching element to stop switching operation when the voltage at the power supply terminal decreases to a stop voltage or less.

2. The switching power supply circuit according to claim 1, further comprising:
a third rectifying element connected to the secondary winding;
a third capacitor connected to the third rectifying element and configured to smooth an output voltage; and
a feedback circuit configured to output a signal representing a relationship in magnitude between the output voltage smoothed by the third capacitor and a constant voltage, wherein
the power control circuit further controls the ratio of on-time to the switching cycle of the switching element, based on the signal from the feedback circuit.

3. The switching power supply circuit according to claim 2, wherein
based on the signal from the feedback circuit, when the output voltage is greater than the constant voltage the power control circuit reduces a duty ratio of a PWM signal to the switching element, and when the output voltage is less than the constant voltage, the power control circuit increases the duty ratio of the PWM signal to the switching element.

4. The switching power supply circuit according to claim wherein
the shut-down circuit includes:
a PNP transistor having an emitter connected to an output of the second rectifying element, a collector connected to the power supply terminal, and a base;
an adjustment resistor and a Zener diode connected in series between the base and a ground; and
a voltage supply resistor disposed between the output of the second rectifying element and the base, wherein
the set voltage is a Zener voltage for the Zener diode.

5. The switching power supply circuit according to claim 1, wherein
the shut-down circuit includes:
a PNP transistor having an emitter connected to an output of the second rectifying element, a collector connected to the power supply terminal, and a base;

an adjustment resistor and a Zener diode connected in series between the base and a ground;
a voltage supply resistor disposed between the output of the second rectifying element and the base; and
a fourth rectifying element disposed between the collector and the power supply terminal, wherein
the set voltage is a Zener voltage for the Zener diode.

6. The switching power supply circuit according to claim 1, wherein
the shut-down circuit includes:
a PNP transistor having an emitter connected to an output of the second rectifying element, a collector connected to the power supply terminal, and a base;
a first adjustment resistor and a Zener diode connected in series between the base and a ground;
a voltage supply resistor disposed between the output of the second rectifying element and the base;
a second adjustment resistor having one end connected to the collector; and
a fourth rectifying element disposed between an other end of the second adjustment resistor and the power supply terminal, wherein
the set voltage is a Zener voltage for the Zener diode.

7. The switching power supply circuit according to claim 1, wherein
the power control circuit determines whether the switching power circuit is in overcurrent condition or not, based on the current sensing voltage generated at the current sense resistor, and when the switching power circuit is in the overcurrent condition, the power control circuit reduces a duty ratio of a PWM signal to the switching element.

8. The switching power supply circuit according to claim 1, wherein
the power control circuit causes the switching element to start the switching operation when the voltage at the power supply terminal increases to a start voltage or higher.

* * * * *